(12) United States Patent
Frey et al.

(10) Patent No.: US 6,369,908 B1
(45) Date of Patent: Apr. 9, 2002

(54) PHOTO KIOSK FOR ELECTRONICALLY CREATING, STORING AND DISTRIBUTING IMAGES, AUDIO, AND TEXTUAL MESSAGES

(76) Inventors: Paul J. Frey, 6406 Hazelwood Ave., Baltimore, MD (US) 21237; J. Andrew Dodge, 707 Ridge Rd., Baltimore, MD (US) 21048

( * ) Notice: Subject to any disclaimer, the term of this patent is extended or adjusted under 35 U.S.C. 154(b) by 0 days.

(21) Appl. No.: 09/282,640

(22) Filed: Mar. 31, 1999

(51) Int. Cl.[7] .............................................. G06F 15/00
(52) U.S. Cl. .......................... 358/1.15; 358/1.9; 396/2
(58) Field of Search ......................... 358/1.1, 1.6, 1.14, 358/1.15, 1.16, 1.17, 1.18, 296, 501, 512, 527, 530; 382/277, 254, 276, 100; 345/467, 473, 475, 112; 348/239, 578, 143; 396/1, 2, 57, 374, 429

(56) References Cited

U.S. PATENT DOCUMENTS

| | | | |
|---|---|---|---|
| 4,789,907 A | 12/1988 | Fischetti et al. ............ 360/33.1 |
| 4,804,983 A | 2/1989 | Thayer, Jr. .................... 354/76 |
| 4,896,175 A | 1/1990 | Thayer, Jr. .................... 354/76 |
| 4,959,670 A | 9/1990 | Thayer, Jr. .................... 354/76 |
| 5,072,246 A | 12/1991 | Thayer et al. ................ 354/78 |
| 5,091,791 A | 2/1992 | Mitchell ..................... 358/479 |
| 5,210,603 A | 5/1993 | Sabin ........................... 358/93 |
| 5,262,815 A | 11/1993 | Aumiller .................... 354/290 |
| 5,343,386 A | 8/1994 | Barber ........................ 364/400 |
| 5,539,453 A | 7/1996 | David et al. .................. 348/77 |
| 5,539,811 A | * 7/1996 | Nakamura et al. ........ 379/93.14 |
| 5,587,740 A | 12/1996 | Brennan ...................... 348/373 |
| 5,623,581 A | 4/1997 | Attenberg .................... 395/106 |
| 5,638,443 A | * 6/1997 | Stefik et al. .................. 705/54 |
| 5,729,741 A | * 3/1998 | Liaguno et al. ............. 707/104 |
| 5,737,729 A | * 4/1998 | Denman ...................... 705/401 |
| 5,749,075 A | 5/1998 | Toader et al. ................. 705/14 |
| 5,761,071 A | * 6/1998 | Bernstein et al. ........... 700/237 |
| 5,781,909 A | * 7/1998 | Logan et al. ................ 707/200 |
| 5,794,221 A | 8/1998 | Egendorf ...................... 705/40 |
| 5,826,267 A | 10/1998 | McMillan ........................ 707/9 |
| 5,845,256 A | * 12/1998 | Pescitelli et al. ............... 705/4 |
| 5,881,234 A | 3/1999 | Schwob .................. 395/200.49 |
| 5,898,780 A | 4/1999 | Liu et al. ....................... 380/25 |
| D410,902 S | 6/1999 | Chiocchi ................... D14/106 |
| 5,913,019 A | 6/1999 | Attenberg .................... 395/117 |
| 5,949,411 A | * 9/1999 | Doerr et al. ................. 345/327 |
| 5,950,173 A | * 9/1999 | Perkowski .................... 705/26 |
| 6,009,410 A | * 12/1999 | LeMole et al. ............... 705/14 |

OTHER PUBLICATIONS

Kodak PhotoNet Online—Wolf Camera.
Press Release—"About Picture Vision" Kodak & NEX-COM.
American Greetings—Greeting Cards plus GreetMail Postcards E–Pix at Photography by J.C. Penney.
Sony Image Station on PhotoNet & Legal Notices.

* cited by examiner

Primary Examiner—Garcia Gabriel

(57) ABSTRACT

A photo kiosk containing a cpu, digital video camera, monitor, a self-contained, limited access cabinet, a payment collection device, a removable electronic storage device, a modem, a microphone, speaker, telephone line, power supply, and lights. The camera takes a picture of the user which is converted into an electronic image. The user can selectively add to the electronic image a banner message, a text message, and/or an audio message. The electronic image, optional banner message, optional text message, and optional audio message are combined into an electronic file. The user can save the electronic file on a removable electronic storage device or can send the electronic file to an electronic address which the user inputs. The photo kiosk can perform system utilities and diagnostics and send the results to a remote location. One can access the photo kiosk from a remote location to perform maintenance and repair. Alternatively, one can perform diagnostics, system utilities, maintenance, and repair on the photo kiosk while at the site of the photo kiosk.

1 Claim, 5 Drawing Sheets

PHOTO KIOSK FOR ELECTRONICALLY CREATING, STORING AND DISTRIBUTING IMAGES, AUDIO, AND TEXTUAL MESSAGES

CROSS-REFERENCE TO RELATED APPLICATIONS

None

STATEMENT REGARDING FEDERALLY SPONSORED RESEARCH OR DEVELOPMENT

None

REFERENCE TO MICROFICHE APPENDIX

N/A

BACKGROUND OF THE INVENTION

1. Field of the Invention

The present invention relates to photo kiosks which are typically located in public access locations and which provide photographs or other images to persons desiring same who interact with the photo kiosk and in the image forming process.

2. Description of the Related Art

In the prior art, photo kiosks provide either an enclosed area or partially enclosed area in which persons desiring a photograph of themselves could pose against a standard background while a photograph was taken. A camera takes the photographic image and then the apparatus contained with the kiosk processes the image. The photo kiosk delivers a finished product to the user. The end product of prior art photo kiosk is typically a single or multiple images of the subject. U.S. Pat. No. 4,959,670 is an example of such a device.

Other types of photo kiosks evolved from the original photo kiosk. In the second generation photo kiosk, the enclosed or partially enclosed area is eliminated. The second generation kiosk permits the user to select a background image. The finished product in the second generation kiosk is in the form of a single image, in the form of additional and separate print of the same image, in the form of a postcard, or multiple image format in the form of "stickers" on a single sheet. U.S. Pat. Nos. 5,343,386 and 5,623,581 are examples of these devices.

BRIEF SUMMARY OF THE INVENTION

It is an object of this invention to have a device which can create an electronic image of the user and to which the user can selectively add textual messages, audio data, and other visual images to the electronic image.

It is a further object of this invention that the user can transmit the electronic image created, as well as any added text message, audio data, and other visual image, via electronic transmission, such as over the Internet or other similar network of computers.

It is a further object of this invention that the user can save the electronic image created, as well as any added text message, audio data, and other visual image, on a removable electronic storage device, such as a computer diskette, CD, tape, or similar item.

It is a further object of this invention that the device perform system utilities and self-diagnostics and can notify a remote monitor of the status of the device.

It is a further object of this invention that one can access the device from a remote location to perform maintenance and repair on the device.

It is a further object of this invention that the device can be accessed by someone located at the site of the device to perform maintenance and repair of the device and to perform diagnostics.

DETAILED DESCRIPTION OF THE INVENTION

Figure 1:
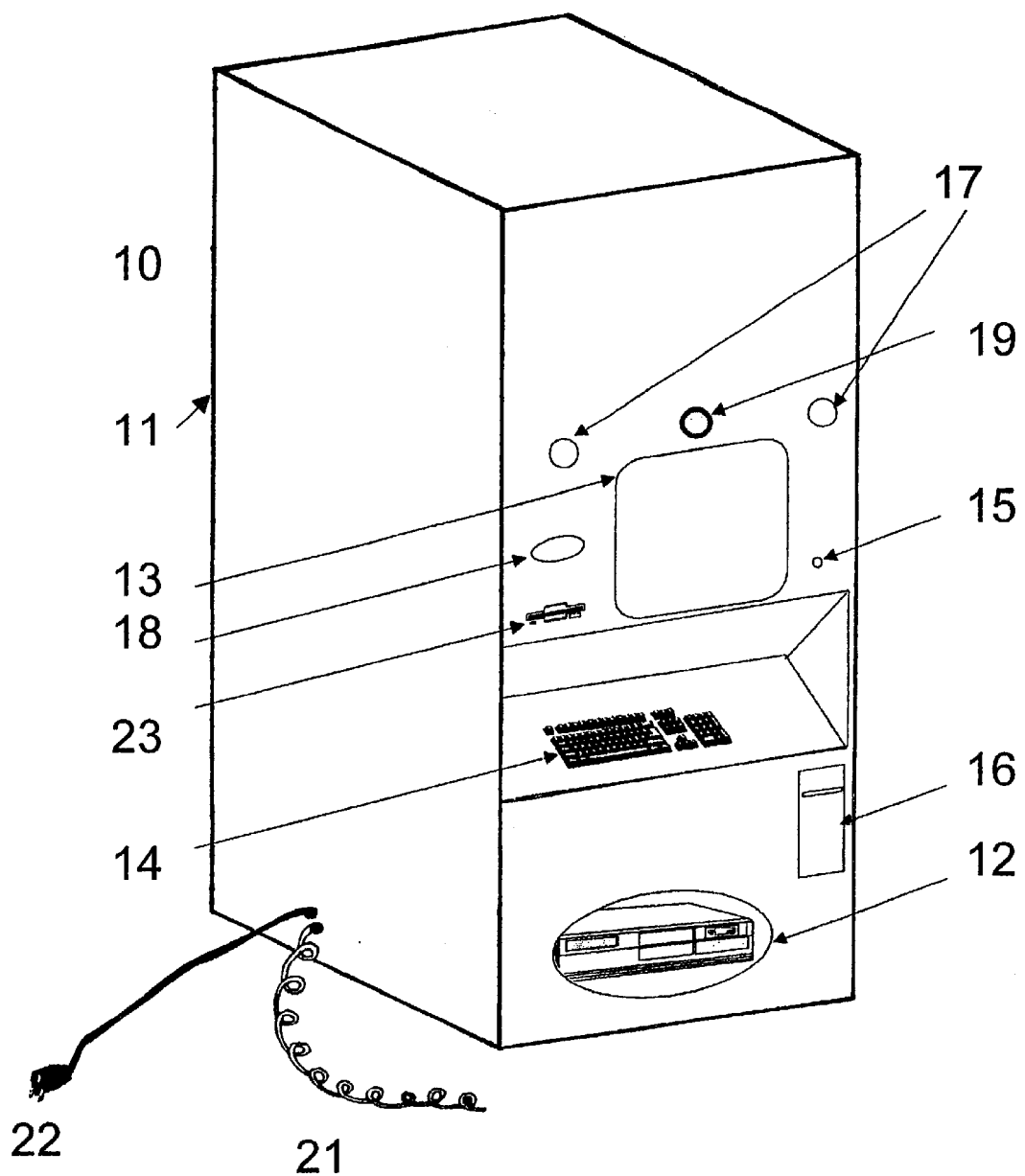
FIG. 1 is a frontal view of the preferred embodiment of the invention with a partial cut-away to reveal the internal components.

The present invention (refer to FIG. 1) provides an improved interactive photo kiosk for creating, storing and distributing electronic images, audio messages, and text messages electronically. FIG. 2 contains a flowchart describing the basic process and the operation of the photo kiosk used for the electronic creation, storage and distribution of images, audio, and text messages. FIG. 2 is explained more fully below.

In the preferred embodiment (FIG. 1), the photo kiosk, 10, has a self-contained, limited access cabinet, 11, that is open-ended and that can be made from plastic, metal, wood, or other material. Inside the cabinet are a cpu, 12, a monitor, 13, a keyboard, 14, a microphone, 15, a payment collection device, 16, one or more lights, 17, a speaker, 18, and a camera, 19. In the preferred embodiment, the camera is a digital video camera, but a digital camera, a regular video camera, or similar device can also be used. A modem for connecting the photo kiosk, 10, to the Internet is contained entirely within the box which holds the cpu, 12, and is connected to the cpu. It is also possible that the modem be outside the box which holds the cpu, but connected to the cpu. A telephone line, 21, is connected to the modem. A power line, 22, is connected to the cpu and other equipment requiring an independent source of power. The monitor, 13, can be a non-interactive monitor or have a touch screen for user input. A removable electronic storage device, 23, is connected to the cpu.

The user does not have access to the cpu, modem, power supply, nor telephone line. The camera, monitor, keyboard, microphone, payment collection device, removable electronic storage device, lights, and speaker are all partially accessible to the user.

The payment collection device, monitor, keyboard, microphone, speaker, camera, removable electronic storage device, and lights are individually connected to the cpu via cables or other connectors that are known in the industry. The connectors permit each individual device to communicate with the cpu and with each other. The cpu coordinates the activity of the various components using standard software that is known in the art-field.

The photo kiosk may have an optional vending device for selling removable electronic storage devices, such as writable CD's, re-writable CD's, floppy disks, tapes, or similar devices.

In the preferred embodiment, the photo kiosk, 10, presents an upright open face which enables a user to stand directly in front of the photo kiosk. While the photo kiosk will usually be located in a high traffic area, such as an airport, shopping mall, tourist attraction, resort, or similar location; the photo kiosk should be located off to the side of the pedestrian pathway. In addition, the photo kiosk should be located so that the user will stand off to the side of the pedestrian pathway. The photo kiosk contains a designated area for the user to stand for optimal image quality. This designated area is located outside the main pedestrian pathway.

Figure 2:
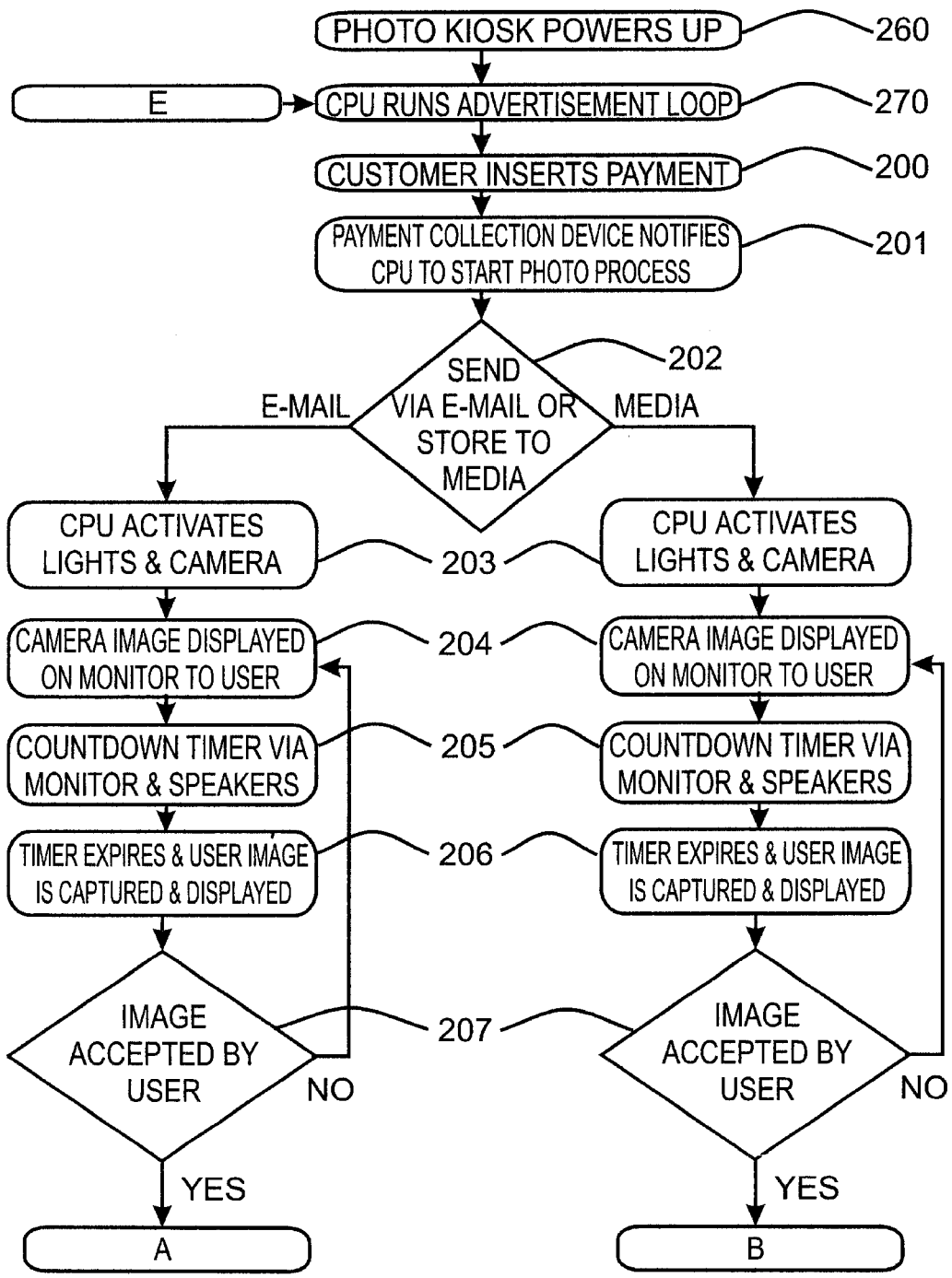
FIG. 2 is a schematic of the routines of the preferred embodiment of the invention.

As illustrated in FIGS. 1 and 2, when a user wants to begin operating the device, the user inserts payment, 200, into the payment collection device, 16. When the correct amount of payment has been entered, the payment collection device notifies the cpu, 201. The cpu then provides the user with the option to send a photo greeting by email or to store the photo greeting on a removable storage device, 202. The cpu provides these options to the user via a message on the monitor, 13, and/or the speaker, 18. The user can select the desired option by entering the information via the touch screen monitor, 13, or by the keyboard, 14.

After the user selects the type of media by which the user wants to save the photo greeting, the cpu activates, 203, the lights, 17, and the camera, 19. The image obtained by the camera is displayed on the monitor, 204. The cpu then instructs the monitor to display a countdown timer that indicates the time remaining before the picture is taken, 205. The countdown timer can be superimposed over the image on the monitor, or in a corner of the monitor. Alternatively, the cpu can provide an audio countdown timer via the speakers, or both an audio and visual countdown timer via the speakers and monitor. The countdown timer can be any preset length of time but thirty seconds may be optimal.

During the countdown, the user can get ready for the picture. When the countdown is complete, the cpu directs the camera to capture an image. The camera sends the captured image to the cpu. The cpu then stores the captured image in memory. The cpu displays the captured image onto the monitor, 13, thereby allowing the user to review the captured image, 206. The cpu directs the monitor and/or the speakers to inform the user of the user's option to select the most recently captured image which is displayed on the monitor, or to delete that image and have the camera take another image, 207. The cpu also notifies the user of the number of times remaining that the user can have an image captured. The user indicates the user's decision via input on the keyboard, 14, or touch screen monitor, 13. If the user selects the most recently captured image which is displayed on the monitor, then the cpu saves the image in memory. If the user decides to have another picture taken, the cpu removes the captured image from the monitor, displays a live image from the camera, 204, and repeats the countdown timer, 205, captures another image, 206, and the option to select the captured image, 207. This process is repeated a predetermined number of times. On the final time, the cpu informs the user that the user is unable to have another image captured and that the most recently captured image which is displayed on the monitor is the image that will be used.

Figure 3:
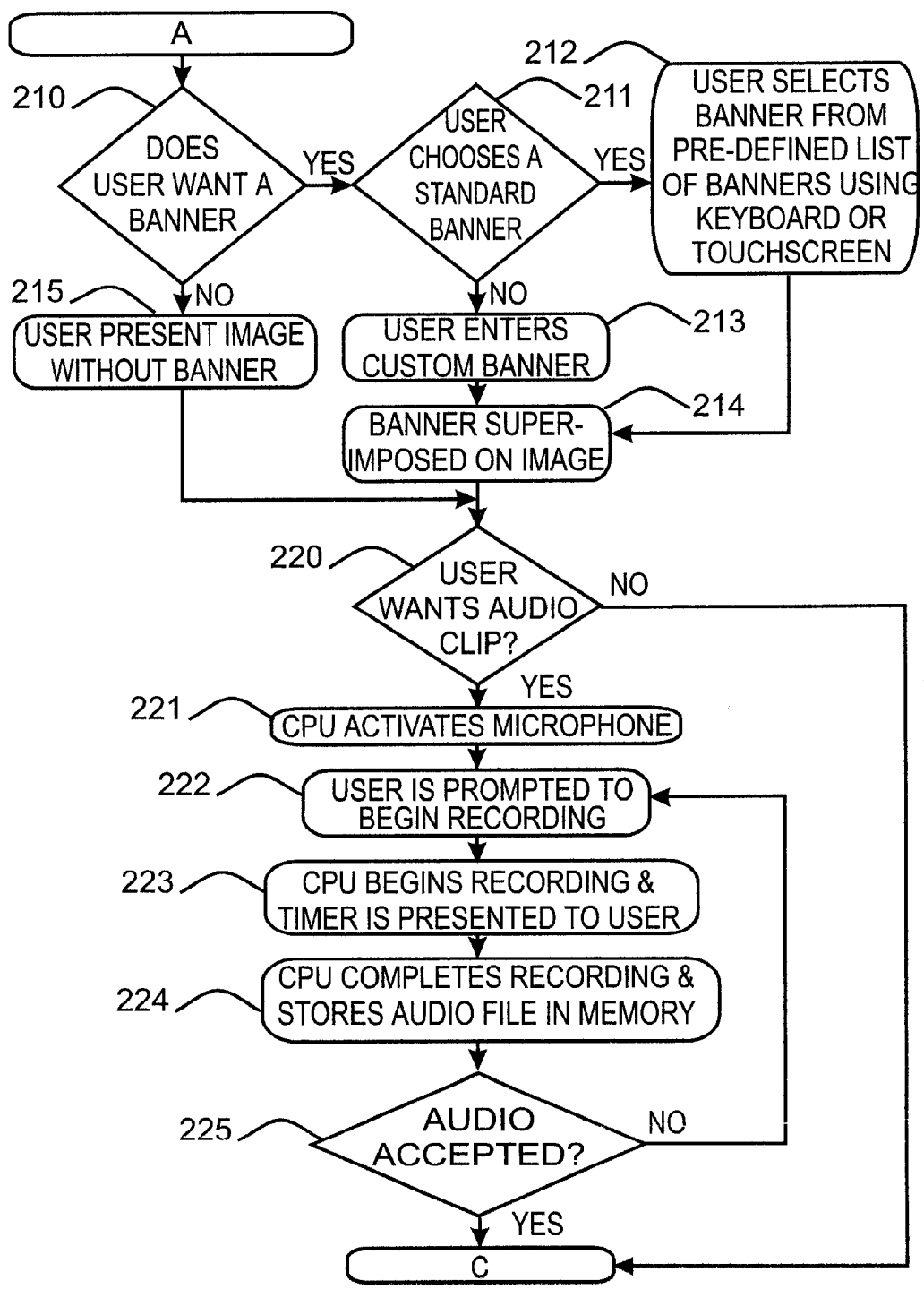
FIG. 3 is a continuation of the schematic of the routines of the preferred embodiment of the invention illustrated in FIG. 2.
Figure 4:
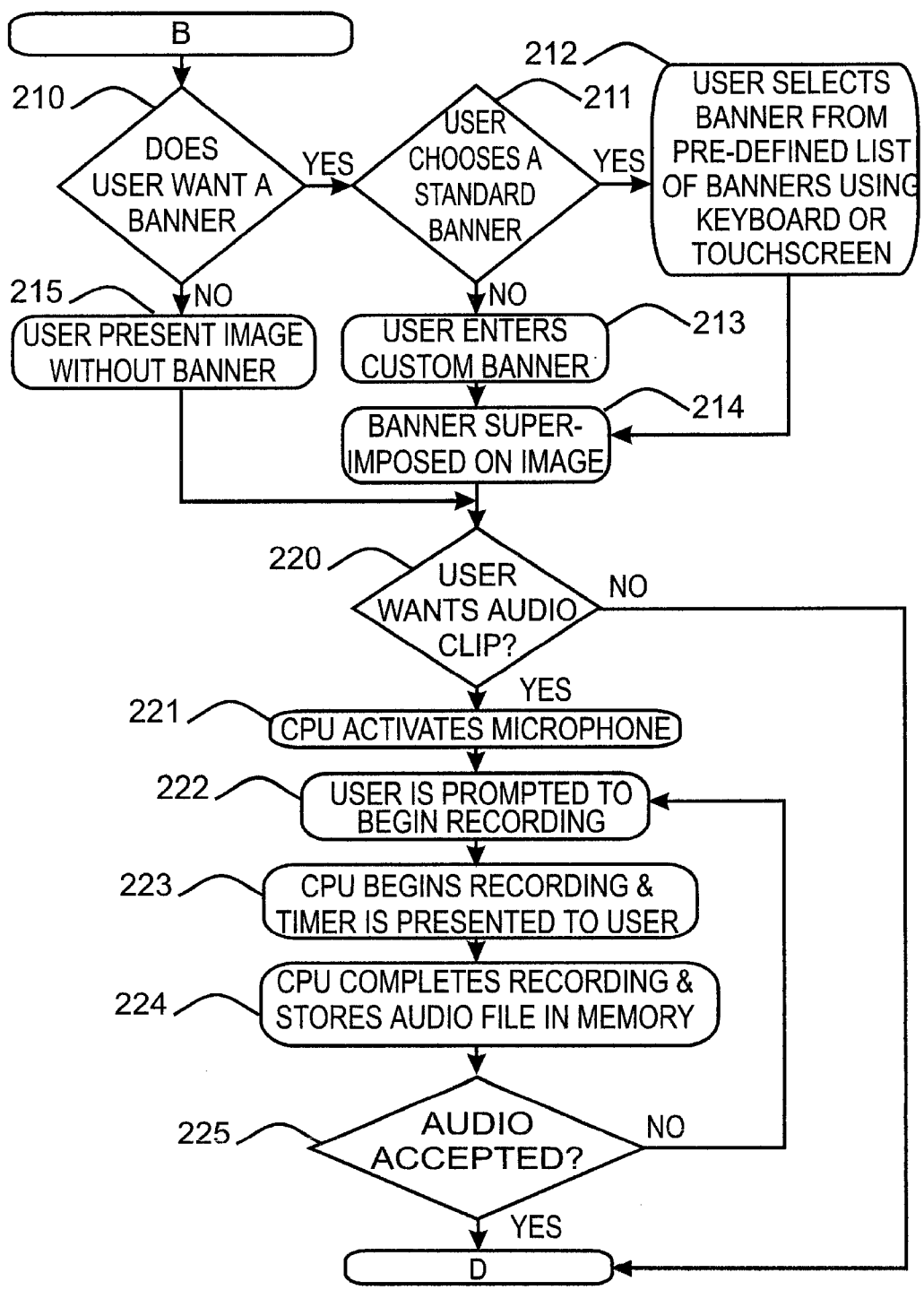
FIG. 4 is a continuation of the schematic of the routines of the preferred embodiment of the invention illustrated in FIG. 2.
Figure 5:
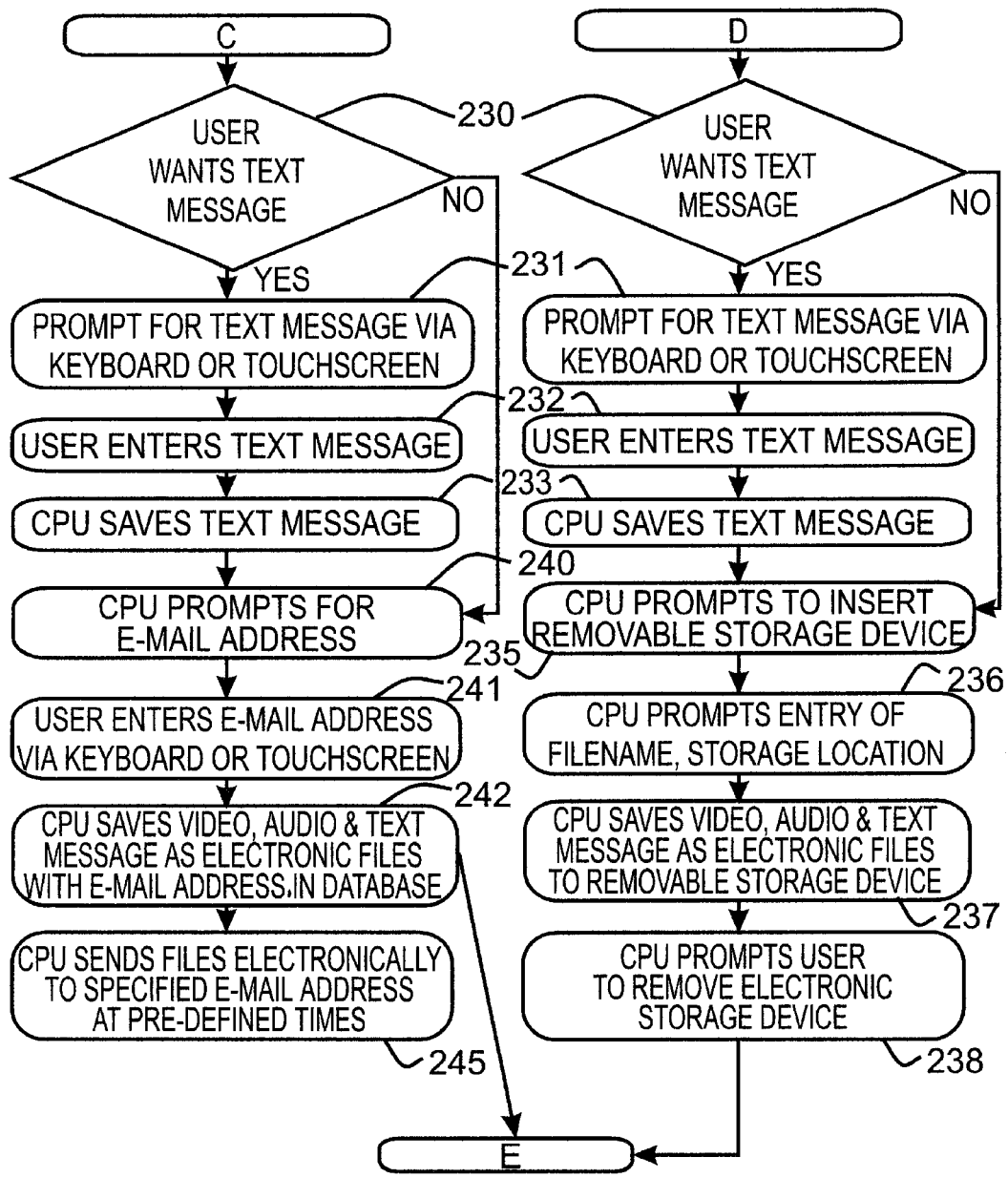
FIG. 5 is a continuation of the schematic of the routines of the preferred embodiment of the invention illustrated in FIGS. 3 and 4.

As illustrated in FIGS. 3 and 4, after the cpu saves the image in memory, the cpu informs the user via the monitor and/or speaker that the user has the option of adding a banner to the image or having no banner added to the image, 210. The cpu informs the user that the banner selected will be superimposed on the electronic image. If the user selects having a banner, then the user is provided the option of selecting a pre-defined banner or creating a customized banner, 211. The cpu displays the pre-defined banners on the monitor, plus the option to customize, plus the option to choose no banner. Several examples of the pre-defined banner are as follows: "Wishing You Were Here", "With Love From$_{13}$ ", "Having A Great Vacation", "We climbed Pikes Peak", and "We saw Old Faithful". The pre-defined banners can be customized to the location of the photo kiosk, prior to or after the invention is placed at the location, or at any time after installation of the invention. The pre-defined banners are stored in the memory of the cpu or on a CD, diskette, or tape that is accessible to the cpu. If the user decides to add a pre-defined banner, the user makes a selection from the banners displayed on the monitor by inputting the selection through the keyboard and/or touch screen monitor, 212. If the user selects the creation of a customized banner, the user enters the customized banner by inputting the information through the keyboard and/or touch screen monitor, 213. After the user completes the user's selection of the predefined banner, or custom banner, the cpu superimposes the selected banner onto the photographic image. The cpu displays the photographic image with the superimposed banner on the monitor, 214. If no banner was selected, then just the photographic image is displayed on the monitor, 215.

Next, the cpu informs the user via the monitor and/or speaker that the user has the option to record an audio message of a predetermined length to go along with the photographic image, 220. The user may select to input an audio message or to not input an audio message. The user performs these selections by selecting the appropriate key on the keyboard or touching the screen in the appropriate place. If the user chooses to record an audio message, the cpu activates the microphone, 221. Then the cpu starts a countdown timer for the audio recording to begin, 222. This countdown timer can be displayed on the monitor and/or projected over the speaker. When the countdown timer reaches zero, the cpu records an audio message, 223. The length of the audio recording is limited to a pre-defined time period at which time the microphone turns off. The cpu provides the user with another countdown to how much longer the recording will last, 223. When the countdown timer expires, the cpu completes recording and stores the audio file in memory, 224. Alternatively, the user may also choose to manually terminate the audio recording process prior to the pre-defined time period through interaction with the keyboard and/or touch screen. After recording the audio message, the user can review the recorded audio message, 225. Similar to the capturing of an image, the cpu informs the user, via a message on the monitor and/or through the speaker, that the user can record the audio message a pre-determined number of times and that the final audio recording will be used if the user does not select an earlier recording. The user inputs the user's decision about accepting or re-recording the audio message via the keyboard and/or touch screen. After the final audio message is recorded or the user selects an audio message, the cpu saves the audio file.

After an audio message is recorded, the cpu then informs the user, via the monitor and/or speaker, that the user has the option to enter a text message of limited length, 230. This text message is separate from the banner. If the user decides to enter a text message the cpu prompts the user to enter the text message via the keyboard and/or touch screen monitor, 231. The user inputs the text message via interacting with the keyboard and/or touch screen, 232. The cpu saves the text message after the user completes entry of the text message, 233. Alternatively, the user does not have to input a text message.

After the user inserted payment, the user was provided the option to save the files onto a removable storage device or to send the files to an email address, 202 (FIG. 2). If the user selected to save the files onto an electronic storage device, the cpu now prompts the user, via the monitor and/or speaker, to insert the user's removable electronic storage device into the appropriate device which is present on the photo kiosk, 235. The cpu then prompts the user, via the monitor and/or speaker, to input the name of the file and the location on the user's removable electronic storage device, 236. The user inputs this information via the keyboard and/or touch screen. After the user inputs the information, the cpu saves the electronic files onto the user's removable electronic storage device under the given name, 237. In such a manner, the user can save the audio, text, and video images as an electronic file for future retrieval and usage. When the cpu completes the transfer of the files, the cpu notifies, via the monitor and/or speaker, the user to remove the user's electronic storage device and thanks the user, 238. The cpu then displays attraction screens and/or advertisements on the monitor, 270 (see FIG. 2).

If the user previously chose to transmit electronically the electronic files, the cpu prompts the user, via the monitor and/or speaker, to enter an email address or other electronic address to which the cpu can transmit the electronic files, 240. The user inputs the email address or other electronic address via the touch screen and/or keyboard, 241. After the destination address is entered, the cpu populates a database with the files (the image, banner, audio message, and text message) and the associated address for later batch transmission, 242. Via the monitor and/or speaker, the cpu then informs the user that the files will be sent at a later time and thanks the user. The cpu then displays attraction screens and/or advertisements on the monitor, 270.

Independent of a user actively using the photo kiosk, the cpu, at predetermined, specific times of day, initiates a connection with the Internet by activating the modem and telephone line. After the connection is made, the cpu transmits the files from within the database to the email address associated with the files, 245. After the transmission of files is completed, the cpu disconnects from the Internet and de-activates the modem and telephone line. The cpu saves the sent files and associated addresses in the database. This information is transferred from the photo kiosk during maintenance procedures and may be used for marketing of additional products. Alternatively, one can transmit the electronic files over a cable line, radio or other electromagnetic waves, or other similar device.

The cpu uses standard software programs that are known in the art field to combine the electronic image captured by the camera, the optional superimposed banner, the optional audio message, and the optional text message into electronic files.

In the preferred embodiment, the user utilizes either a keyboard or touch screen to operate all functions from a user friendly menu. Alternatively, the user could input data via a keypad, speaking into a microphone so long as the cpu as speech recognition software or other similar manners.

When the photo kiosk is not being used by a customer, an advertisement can be displayed on the monitor, 270. (FIG. 2) The advertisement can be such as to entice people to use the device. Alternatively, the advertisement can be for a related or non-related activity, device, or other purpose.

In alternative embodiments, the kiosk can be partially enclosed or fully enclosed with a door or other type of entrance.

The payment collection device can be a card reader for accessing credit cards and debit cards, a bill validator, or a similar device. When a credit or debit card is inserted into the card reader, the card reader, which is connected to the cpu, activates the modem and contacts a central location which verifies the credit/debit card and processes the associated charge to the credit/debit card. When the cpu is notified by the central location that the credit/debit card is valid and the proper payment amount has been processed, the payment collection device then notifies the cpu to begin the photo collection process. This process uses software which known in the art-field and uses the hardware which has been described previously in the manner previously described.

The photo kiosk can perform system utilities and diagnostics on itself. The photo kiosk also transmits routine status and diagnostic status notifications to an off-site location. The photo kiosk automatically and periodically performs system tests and diagnostics to verify the operability and status of the system and automatically sends notifications to a remote center. One method of sending notification is by automatically dialing a pre-defined phone number and alerting a remote system of the photo kiosk's status and diagnostics. Another method of sending notification can be sending an electronic message to a pre-defined e-mail address. Alternative methods of transmitting a message are known in the art field.

In addition, the photo kiosk can be remotely queried via the modem to verify its operability, perform system inquiries, diagnostics, and repair. It is also possible for one to assess the device's operability, and to perform system inquiries, diagnostics, and repair while at the photo kiosk via the keyboard, touch screen, or other input device.

When a photo kiosk is initially installed in a location, one must connect the telephone line to the modem and power supply to the cpu and other components. Then one turns on the cpu, 260. (FIG. 2) Then the cpu performs an initialization routine. The cpu generates a system report and transmits the system report to the administrator via an electronic transfer of the report such as email. Afterwards, the cpu runs advertisements to entice users, 270.

Other embodiments of the invention can contain different devices which perform additional features. The primary features of the invention are discussed herein. It may also be possible to have an embodiment without one or more of the following without deviating from the scope and spirit of the invention: the lights, the speaker, the keyboard, and the microphone.

Although the present invention has been described and illustrated in detail, it is clearly understood that the same is by way of illustration and example and is not to be taken by way of limitation, the spirit and scope of the present invention being limited only by terms of the appended claims.

We claim:

1. A photo kiosk for automatically taking, processing and delivering to a user an electronic image, said kiosk comprising:

a CPU connected to a payment collection device that is selectively activated when a payment is collected by said payment collection device;

a set of lights that are turned ON by said CPU when the payment is collected;

a camera connected to said CPU for capturing the electronic image;

a microphone connected to said CPU by which the user can create an audio file, wherein said audio file can be combine with said captured electronic image;

a speaker connected to said CPU by which said CPU can emit sound for the user to hear;

a keyboard connected to said CPU by which user can input data;

a removable electronic storage device connected to said CPU by which the user can save said captured electronic image;

a monitor connected to said CPU for displaying said captured electronic image, said monitor having a touch sensitive screen for inputting information by the user, allowing the user to selectively add title electronic image such as a banner and/or a text message, and to select the most recently captured electronic image which is displayed by the monitor, allowing the CPU to save the captured electronic image to the removable electronic storage device, and if the user decides to have another picture taken, the CPU removes the captured electronic image from the monitor, displaying a line image from the camera and repeating a countdown to capture another electronic image;

transmitting means for transmitting to a remote location the captured electronic image or a diagnostic status notification to an off-site location, said remote location or off-site location having an electronic address, said electronic address being inputted by the user using the touch sensitive screen or the keyboard, wherein independent of the user actively using the photo kiosk the CPU at a pre-determined or specific times of day, initiates the transmission of the captured electronic image or the diagnostic status notification by using a telephone line; and a self contained, limited access cabinet which holds said CPU, said set of lights, said camera, said microphone, said speaker, said keyboard, said removable electronic storage device, said monitor, and said transmitting means.

* * * * *